(12) United States Patent
Kuisma

(10) Patent No.: US 7,090,375 B2
(45) Date of Patent: Aug. 15, 2006

(54) ARRANGEMENT IN CONNECTION WITH A LIGHTING FIXTURE, AND A LIGHTING FIXTURE

(75) Inventor: Jouko Kuisma, Lahti (FI)

(73) Assignee: Teknoware OY, Lahti (FI)

( * ) Notice: Subject to any disclaimer, the term of this patent is extended or adjusted under 35 U.S.C. 154(b) by 369 days.

(21) Appl. No.: 10/179,084

(22) Filed: Jun. 25, 2002

(65) Prior Publication Data

US 2003/0002289 A1    Jan. 2, 2003

(30) Foreign Application Priority Data

Jun. 29, 2001   (FI) ................... 20011407

(51) Int. Cl.
*F21V 4/00* (2006.01)

(52) U.S. Cl. ............ 362/225; 362/551; 362/555; 362/246; 362/219

(58) Field of Classification Search ........... 362/223, 362/224, 225, 228, 244, 246, 560, 31, 555, 362/576, 240, 247, 551, 219
See application file for complete search history.

(56) References Cited

U.S. PATENT DOCUMENTS

| | | | |
|---|---|---|---|
| 5,647,658 A | 7/1997 | Ziadi | |
| 5,736,686 A * | 4/1998 | Perret et al. | 178/18.11 |
| 5,883,684 A * | 3/1999 | Millikan et al. | 349/65 |
| 6,106,140 A | 8/2000 | Krummer et al. | |
| 6,206,535 B1 * | 3/2001 | Hattori et al. | 362/31 |
| 6,238,075 B1 | 5/2001 | Dealey et al. | |
| 6,390,637 B1 | 5/2002 | Vollkommer et al. | |
| 6,474,857 B1 * | 11/2002 | Ott et al. | 362/551 |
| 6,631,998 B1 * | 10/2003 | Egawa et al. | 362/31 |
| 6,929,382 B1 * | 8/2005 | Kuisma | 362/219 |

FOREIGN PATENT DOCUMENTS

| | | |
|---|---|---|
| DE | 29620583 U | 2/1997 |
| DE | 20007134 U | 9/2000 |
| DE | 198 58 810 A | 5/2002 |
| WO | WO 98/08024 A | 2/1998 |

* cited by examiner

*Primary Examiner*—John Anthony Ward
*Assistant Examiner*—Anabel Ton
(74) *Attorney, Agent, or Firm*—Leydig, Voit & Mayer, Ltd.

(57) ABSTRACT

The arrangement in connection with a lighting fixture, and a lighting fixture, the arrangement comprising a first light source which is arranged in connection with the lighting fixture structure. The arrangement further comprises one or more second light sources and an optic guide, which comprises a first end, a second end and a guide portion between them; is arranged to transmit light over the guide portion between the first end and the second end; and is arranged in connection with a lighting fixture to provide dimmer lighting compared with the lighting provided with the first source, whereby one or more second light sources is/are arranged in connection with one end or both ends of the optic guide and to function as the light source of the optic guide.

10 Claims, 2 Drawing Sheets

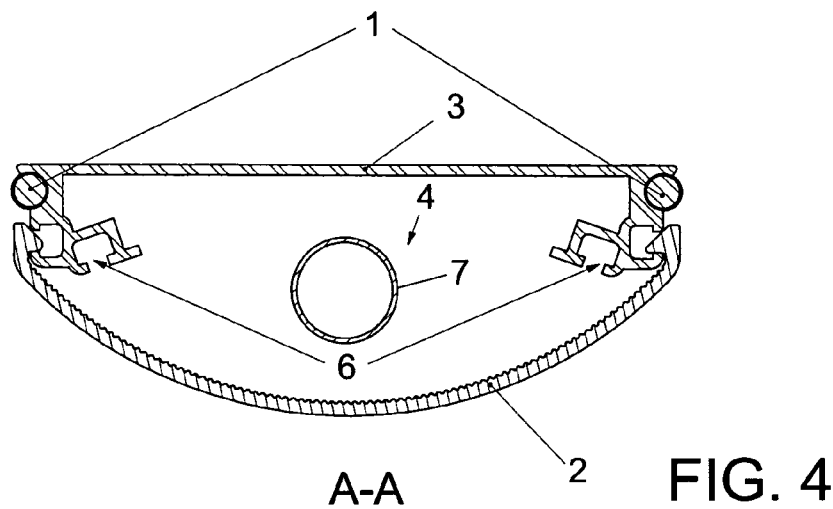
A-A  FIG. 4
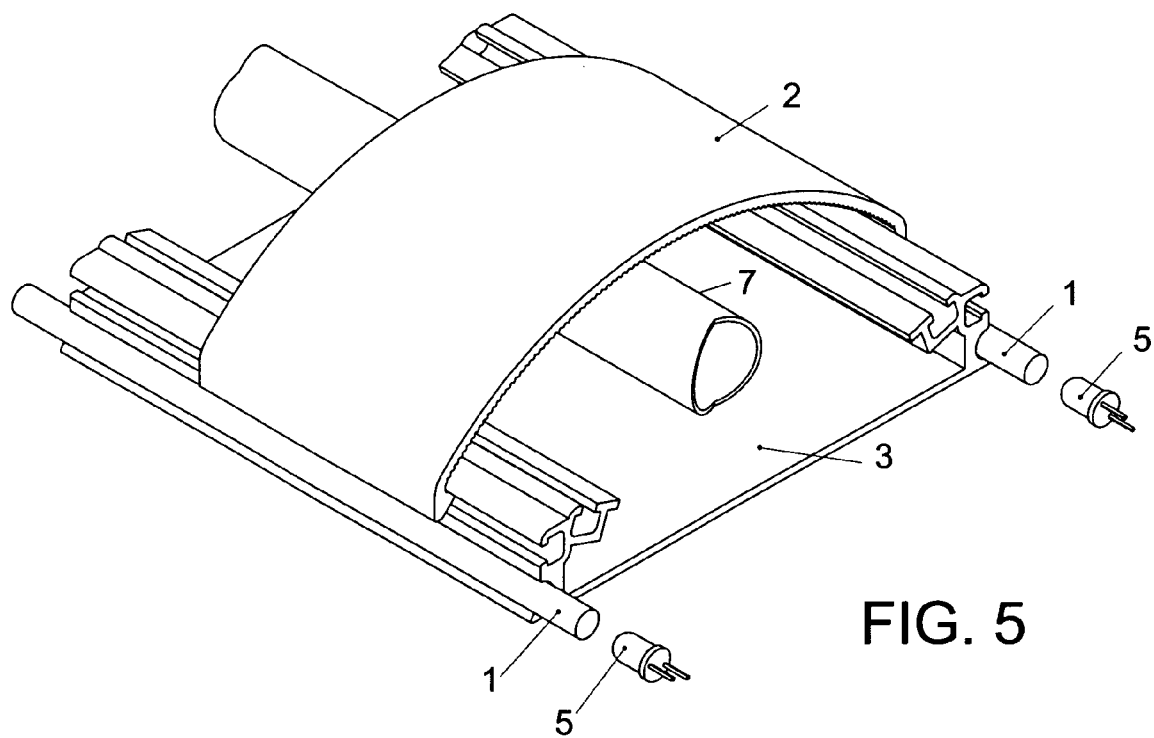
FIG. 5

ARRANGEMENT IN CONNECTION WITH A LIGHTING FIXTURE, AND A LIGHTING FIXTURE

BACKGROUND OF THE INVENTION

The present invention relates to an arrangement in connection with a lighting fixture, the arrangement comprising a first light source arranged in connection with the lighting fixture structure.

In several objects of use of lighting fixtures, adaptability is required of the lighting according to the particular lighting needs and possibly changing conditions. This is the case for instance in public transport vehicles, such as buses, trains and trams, where the level of lighting is adjusted in accordance with generally changing conditions and to make passengers feel more comfortable.

Also inside buildings it is often recommendable to be able to dim the lighting without darkening the particular space completely. Such is the case for example in various serviced flats and the like, where there must always be some kind of lighting in the corridors.

In public transport vehicles, the lighting in the passenger cabin is adjusted for instance in such a way that when the external lighting decreases, the level of lighting in the passenger cabin is lowered, so that the contrast between the lighting conditions outside the vehicle and inside it would not disturb passengers. Dimmed lighting also creates better conditions for sleeping in the passenger cabin. During dimmed lighting, it is typically possible for the passengers to use personal reading lamps, if desired.

Decreasing the lighting is also applied when a vehicle is transported without passengers. In such a case, it is unnecessary to maintain full lighting in the passenger cabin, but for the sake of the driver's safety and the passengers' comfort, there is a reason to maintain some lighting in the passenger cabin.

Presently, decreasing the lighting is implemented in vehicle passenger cabins by using lamps that can be dimmed. A dimming function becomes possible for instance by using fluorescent lamps, the actuator of which is an electronic ballast. Using such a ballast allows the lighting provided with a fluorescent lamp to be dimmed steplessly up to a certain level. However, the minimum lighting provided with fluorescent lamps is in the order of 2 to 5% of the ordinary lighting level of the lamp, this minimum level being often too strong to be comfortable, in particular during dark times. Further, the overall efficiency of fluorescent lighting is significantly reduced because of dimming, whereby, however, the energy consumption for example at a lighting level of 5% is as much as 30% of the ordinary level due to the additional equipment and heater circuits required for the burning of a fluorescent lamp.

Another option to decrease lighting in passenger cabins is to use only a part of the passenger cabin lamps. Partial use of lamps causes, however, uneven distribution of light, there being apparent differences in lighting in different parts of the passenger cabin. Further, partial use of lamps consumes the lamps used for lighting unevenly and causes thus additional maintenance costs.

U.S. Pat. No. 5,647,658 discloses a fiber-optic lighting system for aircrafts. In the system of the publication, fiber-optic cables are used alone for lighting an aircraft cabin. Light is supplied to the fibers by using a high-intensity lamp, and the lighting provided by the fibers is used as the general lighting of the aircraft.

BRIEF DESCRIPTION OF THE INVENTION

An object of the present invention is to provide an arrangement avoiding the above-mentioned drawbacks and allowing implementation of dimmed lighting more simply and reliably than previously. The object is achieved with an arrangement according to the invention, characterized in that the arrangement further comprises one or more second light sources and an optic guide, which comprises a first end, a second end and a guide portion between them, is arranged to transmit light over the guide portion between the first end and the second end, and is arranged in connection with a lighting fixture to provide dimmer lighting compared with the lighting provided with the first light source, whereby one or more second light sources is/are arranged in connection with one end or both ends of the optic guide and to function as the light source of the optic guide.

The invention is based on the idea that lighting dimmer than the ordinary lighting can be implemented by connecting to the lighting fixture an optic guide the side of which transmits light. Such an optic guide can be positioned outside the lighting fixture structure, or alternatively, inside the lighting fixture structure, whereby reflection surfaces or other structures can be used to direct and modify the lighting provided by the guide.

With the solution according to the invention, for instance passenger cabins of public transport vehicles can be provided with dimmer and more even lighting compared with existing solutions, because optic guides can be freely positioned over the whole area of the passenger cabins. In addition, color shades of the lighting can be changed in a simple manner, because the light is produced for the optic guide from one or both ends by using light-emitting diodes, i.e. LEDs, that are available in several different colors. In this way, dim lighting can be provided in a passenger cabin, which lighting is not only both dimmer and more even than in the previous solutions but has also an atmospheric color shade and is generally pleasant for passengers' eyes. Further, using LEDs reduces maintenance costs significantly, because the lifetime of LEDs is very long compared with conventional incandescent or fluorescent lamps.

An object of the invention is also a lighting fixture arranged to receive one or more first light sources and comprising a reflection part and a globe part, the lighting fixture being characterized in that it also comprises one or more elongated grooves arranged to receive an optic guide to provide lighting that is dimmer than the lighting provided with the first light source. Such a lighting fixture structure allows implementation of a lighting arrangement according to the invention in a simple manner.

BRIEF DESCRIPTION OF THE FIGURES

The invention will now be described in more detail in connection with preferred embodiments of which

FIG. 4 shows a partial cross-section of a second embodiment of the arrangement according to the invention; and FIG. 5 shows a cross-section of the embodiment of FIG. 4.

DETAILED DESCRIPTION OF THE INVENTION

Figure 1:
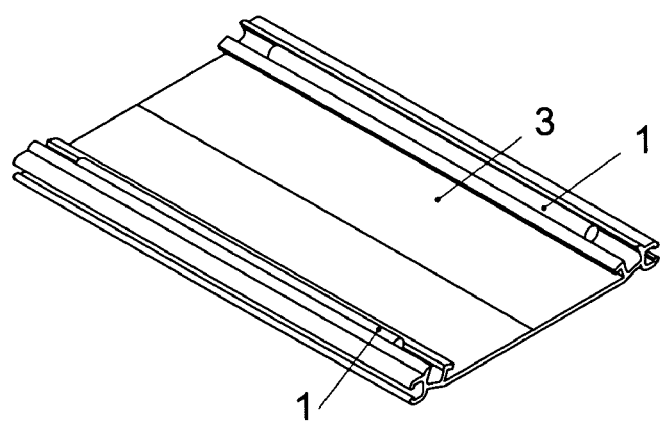
FIG. 1 shows a structure part of a lighting fixture of an embodiment according to the invention.

FIG. 1 shows a lighting fixture structure applicable to be used in the arrangement according to the invention. FIG. 1 shows only the structure forming the reflection portion, i.e. the background portion of the lighting fixture. The reflection part is typically fitted to the ceiling or the like structure of the space to be illuminated, in which case the lighting primarily takes place from up downwards. This background part is usually formed in such a way that it reflects the light directed at it by the light source of the lighting fixture in the direction of lighting.

The arrangement according to the invention comprises a first light source 7 and one or more second light sources 5. In accordance with a preferred embodiment of the invention, the first light source 7 is a fluorescent lamp. The first light source 7 is used as a primary light source, the general lighting being provided with it in the positioning place of the lighting fixture. A typical object of positioning the arrangement according to the invention is a passenger cabin in a public transport vehicle. A public transport vehicle refers for instance to a bus, a train, a mini-bus or the like transport vehicle intended to carry several passengers.

The arrangement of the invention further comprises an optic guide 1 arranged to transmit light supplied to the inside of it from one end, at least over a part of its length. An optic guide is for example of the type disclosed in international publication WO 9808024. The optic guide can be made to transmit light from its side by guiding light to the inside of the guide from one end thereof, or alternatively, from both ends. Thus, the optic guide of the arrangement according to the invention comprises a first end and a second end and a guide portion between these ends. The guide portion functions thus as a light source when light is guided to it in the way described above.

Figure 2:
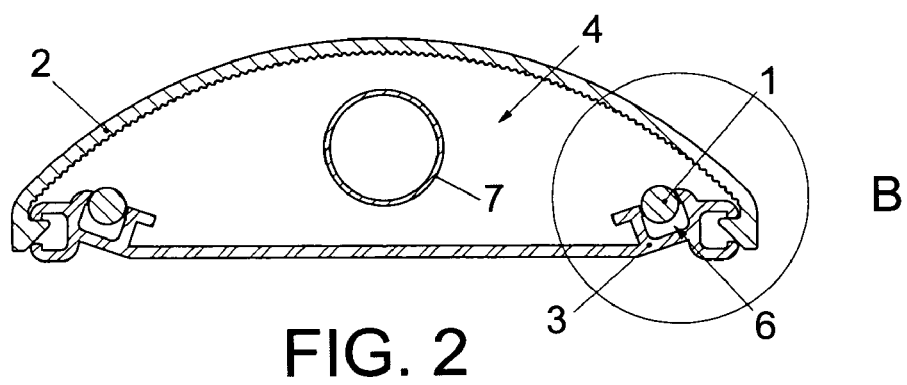
FIG. 2 shows a cross-section of an embodiment of the arrangement according to the invention.

In accordance with the invention, the optic guide is arranged in connection with a lighting fixture to provide lighting dimmer than the lighting provided with the first light source. FIG. 2 shows the cross-section of the structure of an embodiment according to the invention. The cross-section indicates the background part of the lighting fixture, i.e. a reflection part 3, and a globe part 2 connected to each other. The globe part is used to protect fluorescent lamps and to modify the lighting provided by them. The globe is naturally made of a light-transmitting material, which, for instance, softens the light provided by the light source.

As mentioned earlier, the background part 3 is typically fitted to the ceiling or the like structure of the space to be illuminated, the lighting taking place primarily from up downwards. In addition, the invention of the general lighting is to provide even lighting, whereby the background part is to provide the object to be illuminated with lighting that is as even as possible.

In accordance with the embodiment, the first light source 7 is a fluorescent lamp, but the structure and location of the fluorescent lamp will be understood by those of skill in the art. According to the luminosity required, several fluorescent lamps can be used in one lighting fixture. It is obvious, however, that in FIG. 2 the first light sources are positioned inside a space 4 formed by the reflection part and the globe part.

FIG. 2 shows an optic guide 1 according to the arrangement of the invention, there being two such guides positioned inside the space formed by the reflection part and the globe part in accordance with the invention. In the embodiment, the optic guides are attached to grooves in the background part 3, one of the grooves being shown in greater detail in FIG. 3. The arrangement according to the invention also comprises one or more second light sources 5. These second light sources 5 are used for supplying light to the optic guides. Preferably, the second light source is a light-emitting diode. Also, a fluorescent, incandescent or other corresponding lamp can be used as the second light source 5. An advantage of light-emitting diodes is the low luminosity required and the very long lifetime. Further, light-emitting diodes are available in a plurality of different colors, whereby the crepuscular lighting of a passenger cabin can be implemented as colored lighting in a simple manner. Colored or shaded lighting can also be implemented by using conventional fluorescent or incandescent lamps. In such a case, separate filters must be used to achieve the desired shade.

The idea of the invention is that when light sources used for ordinary lighting, i.e. the first light sources, can no longer be dimmed, the optic guides 1 are taken into use and the use of the first light sources is stopped completely, or light of a different color, such as green, red, blue or yellow, is provided with the second light source. Although the luminosity provided with an optic guide is low, it is still pleasant and sufficient in dim or dark conditions.

As becomes obvious from the figure, the lighting fixtures are elongate when the object of use of the lighting fixture is the passenger cabin of a public transport vehicle. Thus it is obvious that the lighting fixtures are to be positioned evenly over a distance of several meters to achieve even lighting in the whole passenger cabin. Thus, the lighting can be implemented with a light line. In practice, a light line forms one long lighting fixture structure, which can be implemented with several fluorescent lamps positioned one after another. In public transport vehicles, lighting can be implemented conventionally by using separate lighting fixtures. The lighting fixtures can be of any form; thus, they can be round or oval, for example.

As mentioned earlier, the optic guide 1 of the arrangement according to the invention comprises a first and a second end and a guide portion between them. In order to make the guide portion capable of illumination longer, the optic guide is, in accordance with the embodiment, illuminated from its both ends. In this way, the size of the guide portion capable of illumination can be increased significantly. The optic guide can be connected according to the invention to be in connection with both a light line and a separate lighting fixture. Due to the restricted size of the guide portion capable of illumination, as many optic guides as required must be positioned in connection with the light line.

Figure 3:
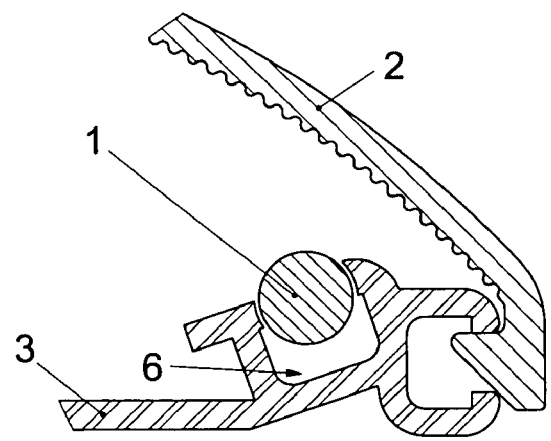
FIG. 3 shows a detailed illustration of the cross-section of FIG. 2.

FIGS. 1, 2 and 3 show an embodiment in which the optic guide is positioned inside the globe 2 of the lighting fixture. The invention can, however, be applied in such a way that the optic guide is positioned outside the lighting fixture structure. Such an embodiment is shown in FIGS. 4 and 5. As becomes obvious from the figures, the optic guide 1 is in the embodiment mounted on the outer surface of the lighting fixture structure, in an elongate groove 6. In the embodiment, the groove is formed at the outer edge of the background part 3, whereby the optic guide stays outside the space 4 formed by the reflection part 3 and the globe part 2. At its simplest, the arrangement can be implemented by using a lighting fixture according to the invention, some embodiments of which are shown in FIGS. 1 to 5. In the embodiment of the lighting fixture shown in FIGS. 4 and 5, elongate grooves 6 receiving the optic guide are arranged in both the inside and the outside of the lighting fixture. Thus, using the same structure, it is possible to select between two positioning options for the optical guides providing dim lighting.

It is not necessary, however, to position the guide fixedly in the lighting fixture structure. In passenger cabins of public transport vehicles, suitable objects of positioning include the outer edges of the lighting fixture, ceiling structures, luggage rack structures and other fixed structures in the passenger cabin, from which the light provided by the optic guide illuminates the passenger cabin in a desired manner.

The simplest way to use the arrangement is such that the driver of a transport vehicle, for instance, has lighting control devices by means of which the lighting can be dimmed. When the first light sources have been dimmed to the maximum value, the second light sources begin to produce light that illuminates the passenger cabin via optic guides. The control devices may also have different switches for the use of the two light sources. It is also feasible to dim the lighting of the passenger cabin automatically by means of optic sensors.

In the above, the invention has been described particularly in connection with a public transport vehicle. It is understandable, however, that the arrangement according to the invention can be applied to several different objects of use without restricting it only to public transport vehicles.

It will be obvious to a person skilled in the art that with the advance of technology, the basic idea of the invention can be implemented in a plurality of ways. Thus, the invention and its embodiments are not confined to the above examples but can vary within the scope of the claims.

The invention claimed is:

1. An arrangement in connection with a lighting fixture, the arrangement comprising:
    a first light source providing a first lighting level to the lighting fixture,
    at least one second light source, and
    an optic guide, the optic guide comprising a first end, a second end and a guide portion between them, the at least one second light source being disposed to transmit light from at least one end of the first and second ends, wherein the transmitted light is radiated from at least a portion of the guide portion to provide a second lighting level to the lighting fixture, the second lighting level being dimmer as compared with the first lighting level, wherein the lighting fixture provides the second lighting level alternatively to the first lighting level.

2. The arrangement of claim 1 wherein the second light source is a light-emitting diode.

3. An arrangement in connection with a lighting fixture, the arrangement comprising:
    a first light source providing a first lighting level to the lighting fixture,
    at least one second source, and
    an optic guide, the optic guide comprising a first end, a second end and a guide portion between them, the at least one second light source being disposed to transmit light from at least one end of the first and second ends over at least a portion of the guide portion, the optic guide providing a second lighting level to the lighting fixture, the second lighting level being dimmer as compared with the first lighting level, wherein the lighting fixture provides the second lighting level alternatively to the first lighting level, wherein the first light source is a fluorescent lamp.

4. The arrangement of claim 3 wherein the second light source is a light-emitting diode.

5. The arrangement of claim 1, wherein the first light source is an incandescent lamp.

6. The arrangement of claim 5 wherein the second light source is a light-emitting diode.

7. The arrangement of claim 1 wherein the lighting fixture comprises an enclosed structure, the first light source being arranged inside the enclosed structure, the optic guide being at least partly arranged inside the enclosed structure.

8. The arrangement of claim 1 wherein the lighting fixture comprises an enclosed structure, the first light source being arranged inside the enclosed structure, the optic guide being arranged outside the enclosed structure.

9. A lighting fixture arranged to receive one or more first light sources providing a first light level, the lighting fixture comprising a reflection part, a globe part and one or more elongated grooves arranged to receive an optic guide, said optic guide providing a second light level that is dimmer than the first light level, wherein the lighting fixture provides the second lighting level alternatively to the first lighting level, wherein the reflection part and the globe part form a substantially solid structure, the elongate groove of the lighting fixture being arranged in the reflection part inside the solid structure.

10. A lighting fixture arranged to receive one or more first light sources providing a first light level, the lighting fixture comprising a reflection part, a globe part and one or more elongated grooves arranged to receive an optic guide, said optic guide providing a second light level that is dimmer than the first light level,
    wherein the reflection part and the globe part form a substantially solid structure, the elongated groove of the lighting fixture being arranged in the reflection part outside the solid structure.

* * * * *